(12) United States Patent
MacNamara et al.

(10) Patent No.: US 11,301,020 B2
(45) Date of Patent: Apr. 12, 2022

(54) DATA CENTER POWER MANAGEMENT

(71) Applicant: Intel Corporation, Santa Clara, CA (US)

(72) Inventors: Christopher MacNamara, Limerick (IE); John J. Browne, Limerick (IE); William J. Bowhill, Framingham, MA (US); Christopher Nolan, Shannon (IE); Nemanja Marjanovic, Ballybane (IE); Rory Sexton, Fermoy (IE); Padraic Agnew, Kilmurry (IE); Colin Hanily, Limerick (IE)

(73) Assignee: Intel Corporation, Santa Clara, CA (US)

( * ) Notice: Subject to any disclaimer, the term of this patent is extended or adjusted under 35 U.S.C. 154(b) by 941 days.

(21) Appl. No.: 15/601,296

(22) Filed: May 22, 2017

(65) Prior Publication Data

US 2018/0335824 A1 Nov. 22, 2018

(51) Int. Cl.
*G06F 1/32* (2019.01)
*G06F 1/3209* (2019.01)
*H04L 41/0893* (2022.01)
*H04L 43/16* (2022.01)
*H04L 43/08* (2022.01)
*G06F 1/26* (2006.01)
*G06F 1/324* (2019.01)
*H04L 43/0876* (2022.01)

(52) U.S. Cl.
CPC ............ *G06F 1/3209* (2013.01); *G06F 1/266* (2013.01); *G06F 1/324* (2013.01); *H04L 41/0893* (2013.01); *H04L 43/08* (2013.01); *H04L 43/0876* (2013.01); *H04L 43/16* (2013.01)

(58) Field of Classification Search
CPC ............... G06F 1/32; G06F 21/57; G06F 9/44
See application file for complete search history.

(56) References Cited

U.S. PATENT DOCUMENTS

| 7,002,918 | B1 * | 2/2006 | Prieto, Jr. | .......... | H04B 7/18582 370/252 |
|---|---|---|---|---|---|
| 2006/0080461 | A1 * | 4/2006 | Wilcox | .................... | H04L 12/12 709/238 |
| 2007/0005742 | A1 * | 1/2007 | Eldar | ...................... | H04L 67/10 709/223 |
| 2011/0063004 | A1 * | 3/2011 | Chen | ....................... | H03L 7/093 327/157 |
| 2015/0237578 | A1 * | 8/2015 | Gogate | ............... | H04W 52/029 370/311 |
| 2015/0365538 | A1 * | 12/2015 | Yoon | ................. | H04W 28/0289 455/407 |

(Continued)

*Primary Examiner* — Keshab R Pandey
(74) *Attorney, Agent, or Firm* — Patent Capital Group

(57) ABSTRACT

In an example, there is disclosed a demand scaling engine, including: a processor interface to communicatively couple to a processor; a network controller interface to communicatively couple to a network controller and to receive network demand data; a scaleup criterion; a current processor frequency scale datum; and logic, provided at least partly in hardware, to: receive the network demand data; compare the network demand data to the scaleup criterion; determine that the network demand data exceeds the scaleup criterion; and instruct the processor via the processor interface to scaleup processor frequency.

29 Claims, 8 Drawing Sheets

(56) References Cited

U.S. PATENT DOCUMENTS

| | | | |
|---|---|---|---|
| 2016/0055066 A1* | 2/2016 | Parra | G06F 11/1451 |
| | | | 714/19 |
| 2016/0062438 A1* | 3/2016 | Das | G06F 1/3206 |
| | | | 713/322 |
| 2016/0062798 A1* | 3/2016 | Lee | G06F 9/5027 |
| | | | 718/104 |
| 2016/0246652 A1* | 8/2016 | Herdrich | G06F 9/5077 |

* cited by examiner

DATA CENTER POWER MANAGEMENT

FIELD OF THE SPECIFICATION

This disclosure relates in general to the field of cloud computing, and more particularly, though not exclusively to, a system and method for data center power management.

BACKGROUND

Contemporary computing practice has moved away from hardware-specific computing and toward "the network is the device." A contemporary network may include a data center hosting a large number of generic hardware server devices, contained in a server rack for example, and controlled by a hypervisor. Each hardware device may run one or more instances of a virtual device, such as a workload server or virtual desktop.

In some cases, a virtualized network may also include network function virtualization (NFV), which provides certain network functions as virtual appliances. These functions may be referred to as virtual network functions (VNFs). In the past, the functions provided by these VNFs may have been provided by bespoke hardware service appliances.

Thus, in a contemporary "cloud" architecture, both network endpoints and network infrastructure may be at least partially provided in a virtualization layer.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
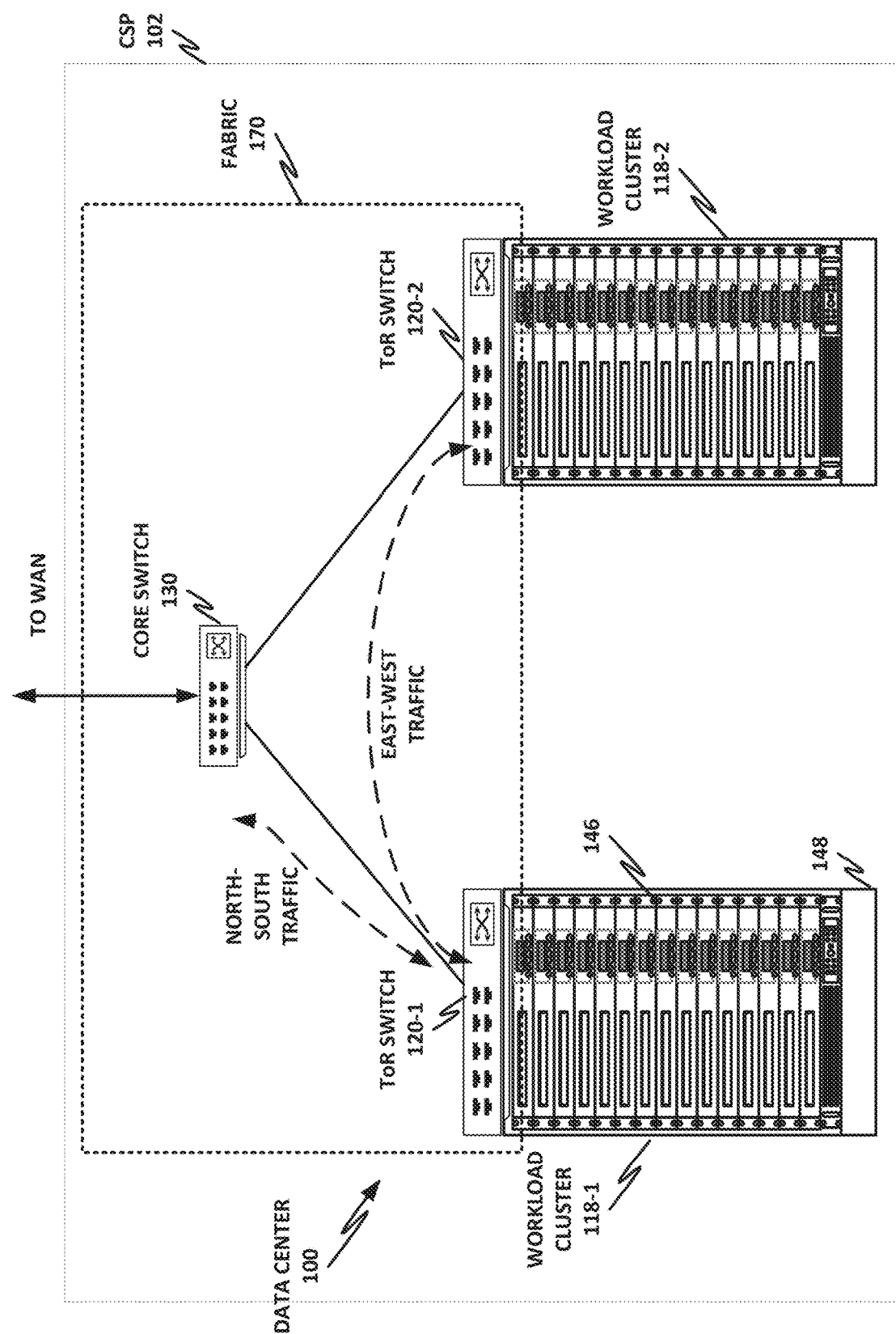
FIG. 1 is a network-level diagram of a cloud service provider (CSP), according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Power management is a problem almost as old as the concept of electronic computing itself. It is often beneficial to provide a computing system—such as a data center, a 5G wireless network, or an "internet of things" (IoT) ecosystem—with the available computing power to handle the maximum workload that the system is intended to encounter. But it is not always efficient to have that maximum capacity available at all times. Consider, for example, the case of a large data center with a large number of compute nodes, as well as host fabric interfaces, network switches, and other peripheral devices all ready to handle a large workload. This data center may, for example, provide wireless Internet access to the downtown area of a large city. During the day, millions of people may be in the downtown area needing access to the wireless Internet services. Thus, a very large base of compute resources needs to be available to handle those large workloads.

But as ordinary business hours wind down, the demand on the network may subside substantially. For example, at peak times, the downtown data center may have millions of users, while at off-peak hours, such as overnight, the demand may be as low as a few tens of thousands of users.

It is inefficient to draw maximum power to support a large number of processors, ingress interfaces, egress interfaces, and other compute resources designed to accommodate millions of users while servicing only a few tens of thousands of users. Thus, power management systems may be provided to disable and power down certain resources during off-peak times. In general, the issue of powering down is not difficult, because a nonaggressive power down sequence will at worst have slightly too much computing power available for the current demand.

The issue of powering up may be somewhat more difficult. Consider the example where a number of buses and trains start arriving downtown at approximately the same time, simultaneously delivering large numbers of commuters to the downtown area. These commuters immediately start logging onto the wireless internet, and within a very few minutes, infrastructure that has been powered down to meet the needs of a few tens of thousands of users will suddenly have to accommodate hundreds of thousands or millions of users. If the power up occurs at ordinary software speeds, reacting solely to overloading on the CPU, the users who initially start logging on may experience significant latency as the system ramps back up resources that have been dormant overnight. This may result in poor user experience, and services may be delayed or non-existent because the infrastructure cannot handle the load and networking packets are dropped. If the latency is substantial, users may become dissatisfied with the experience, and may look for other options.

To achieve power up of resources at greater speeds, the present specification discloses a "headless" power management system, in which power management features may be provided by a demand scaling engine that is highly responsive to instant network and processor demands. The demand scaling engine may include a coprocessor, such as an FPGA or an ASIC, and may also include additional hardware or software to provide the logic to carry out the demand scaling function. In other examples, the demand scaling engine may be a privileged software process that executes outside of the normal software stack, such as in ring 0 of a protection architecture, outside of the operating system, or at a very low level of the operating system.

Assessment of the work demand on a core may be based in part on the P-state of the workload core. But the demand scaling engine of the present specification not only responds to the current demand on the CPU, but also takes into account the current demand on the network, such as incoming (Rx) and outgoing (Tx) packet queues, memory buffering in network card devices attached to the host CPU, or other factors that provide a "peek ahead" at changing network traffic conditions. In an example, the demand scaling engine examines the current CPU load, as well as factors such as buffer occupancy for a NIC buffer, the number of packets in flight, and the current CPU cost (in terms of cycles or microseconds) of processing a single packet.

After examining these factors, the demand scaling engine may check thresholds, which may be provided by an administrative function such as an orchestrator, or locally by an application, and if the current demand is above the threshold, then the demand scaling engine begins scaling up processor speed according to an incremental scaling factor. For example, the incremental scaling factor may be a step size between, for example, 100 and 500 MHz. So if the processor is currently operating at 1 GHz, and the scaling factor is 200 MHz, if the demand scaling engine determines that demand is increasing, the processor speed may scale up to 1.2 GHz. If demand continues to increase, the processor scales up to 1.4 GHz. This continues until demand stops increasing, or a maximum processor speed threshold is reached. Similarly, if demand decreases, the processor may be scaled down to 1.2 GHz, then down to 1 GHz, and so on until a minimum processor speed threshold is reached. Note that although processor speed scaling is disclosed herein as an example of a resource scale, other resources may also be scaled, such as ingress and egress interfaces, interconnects, buses, wireless interfaces, or other power-consuming resources.

Advantageously, the demand scaling engine selects an appropriate CPU frequency for high bandwidth, latency-critical network traffic, in a hitless manner. This allows the frequency of the processor cores to 'follow' network load, achieving best power saving when network load is low but matching network bursts and spikes in traffic.

The orchestrator delivers a general power management policy and the demand scaling engine may monitor for exceptions to the policy.

In one example, the demand scaling engine may be provided in a standard OS networking stacks, with Data Plane Development Kit (DPDK) accelerated applications and stacks, in either a bare metal or virtualized environments. The system and method of the present specification, which in some embodiments may include a physical IP block, may be used in virtual switches and any switch device-to-host interfaces or frame based IO devices.

The demand scaling engine allows high throughput latency-sensitive packet processing of workloads, and at appropriate times allows the CPU to enter energy efficient states such as P or C, while retaining the ability to respond to bursts of network traffic. Because the demand scaling engine responds at hardware or near-hardware speeds, it can respond to network traffic bursts without substantial latency or packet loss.

The demand scaling engine provides advantages over existing systems that rely on CPU load along. Because the CPU load lags behind the network load, software that merely monitors the CPU load and responds after-the-fact may lead to latency and packet loss. But the demand scaling engine of the present specification accounts for packet processing workloads in the NIC or fabric interface. Early detection of these bursts helps to ensure that CPU speeds can be scaled up proactively to correct the CPU response time before it becomes a bottleneck.

A single core prototype of a demand scaling engine realized advantages, including:
 a. 5 watts power saved.
 b. Maximum latency reduced from 495 µs to 42 µs.
 c. Average latency reduced from 26 µs to 20.6 µs.

A system and method for data center power management will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a network 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of a traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include a fabric interface, such as an Intel® Host Fabric Interface (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® OmniPath™, TrueScale™, Ultra Path Interconnect (UPI) (formerly called QPI or KTI), STL, FibreChannel, Ethernet, FibreChannel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as OmniPath™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
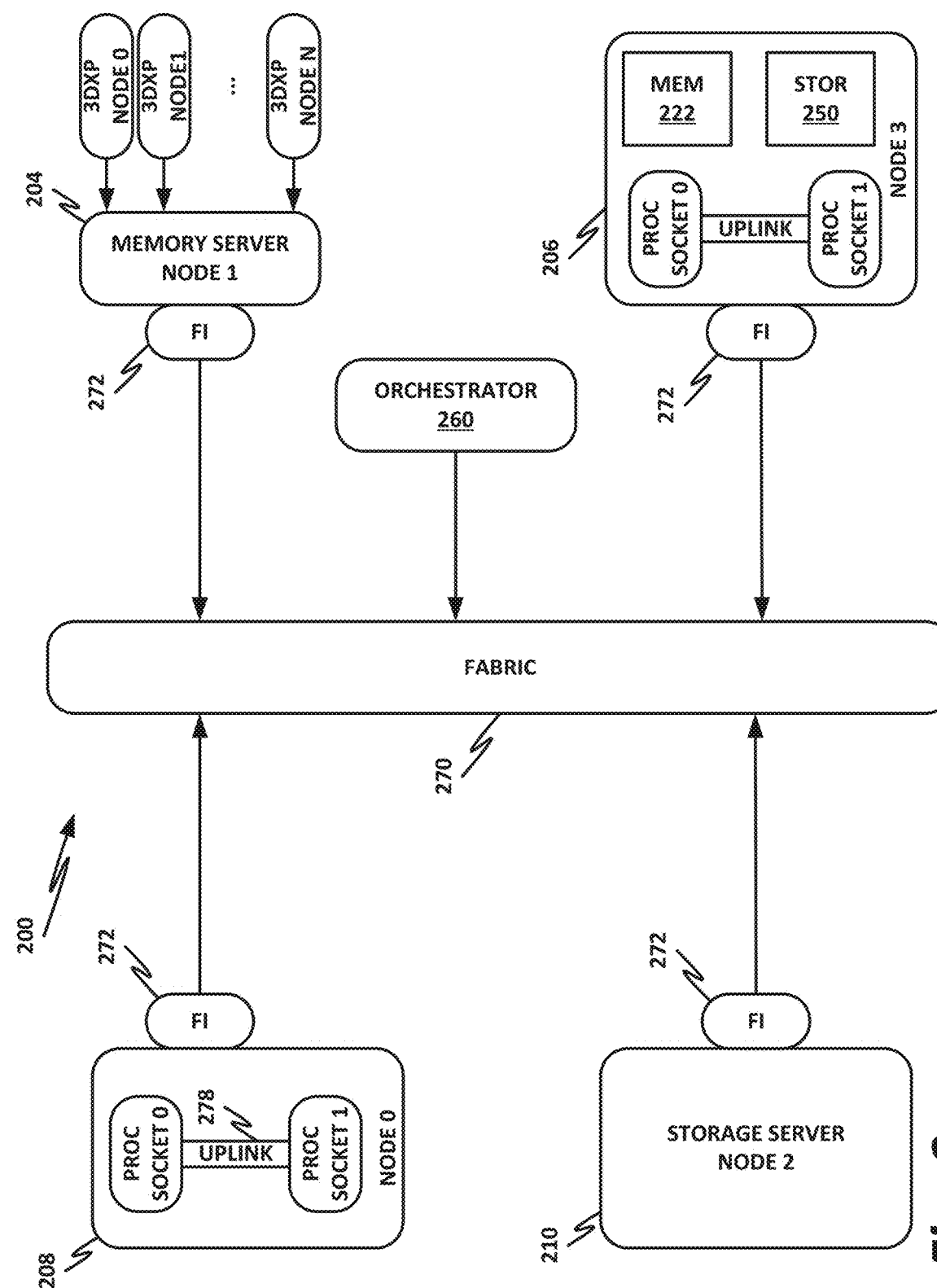
FIG. 2 is a block diagram of a data center, according to one or more examples of the present specification.

FIG. 2 is a block diagram of a data center 200, according to one or more examples of the present specification. Data center 200 may be, in various embodiments, the same data center as Data Center 100 of FIG. 1, or may be a different data center. Additional views are provided in FIG. 2 to illustrate different aspects of data center 200.

In this example, a fabric 270 is provided to interconnect various aspects of data center 200. Fabric 270 may be the same as fabric 170 of FIG. 1, or may be a different fabric. As above, fabric 270 may be provided by any suitable interconnect technology. In this example, Intel® OmniPath™ is used as an illustrative and nonlimiting example.

As illustrated, data center 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via a fabric interface 272. Fabric interface 272 may be any appropriate fabric interface as described above, and in this particular illustrative example, may be an Intel® Host Fabric Interface for connecting to an Intel® OmniPath™ fabric. In some examples, communication with fabric 270 may be tunneled, such as by providing UPI tunneling over OmniPath™.

Because data center 200 may provide many functions in a distributed fashion that in previous generations were provided onboard, a highly capable fabric interface 272 may be provided. Fabric interface 272 may operate at speeds of multiple gigabits per second, and in some cases may be tightly coupled with node 0 208. For example, in some embodiments, the logic for fabric interface 272 is integrated directly with the processors on a system-on-a-chip. This provides very high speed communication between fabric interface 272 and the processor sockets, without the need for intermediary bus devices, which may introduce additional latency into the fabric. However, this is not to imply that embodiments where fabric interface 272 is provided over a traditional bus are to be excluded. Rather, it is expressly anticipated that in some examples, fabric interface 272 may be provided on a bus, such as a PCIe bus, which is a serialized version of PCI that provides higher speeds than traditional PCI. Throughout data center 200, various nodes may provide different types of fabric interfaces 272, such as onboard fabric interfaces and plug-in fabric interfaces. It should also be noted that certain blocks in a system on a chip may be provided as intellectual property (IP) blocks that can be "dropped" into an integrated circuit as a modular unit. Thus, fabric interface 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a fabric interface 272, which provides fast communication that makes these technologies possible.

By way of further illustration, node 3 206 is also depicted. Node 3 206 also includes a fabric interface 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
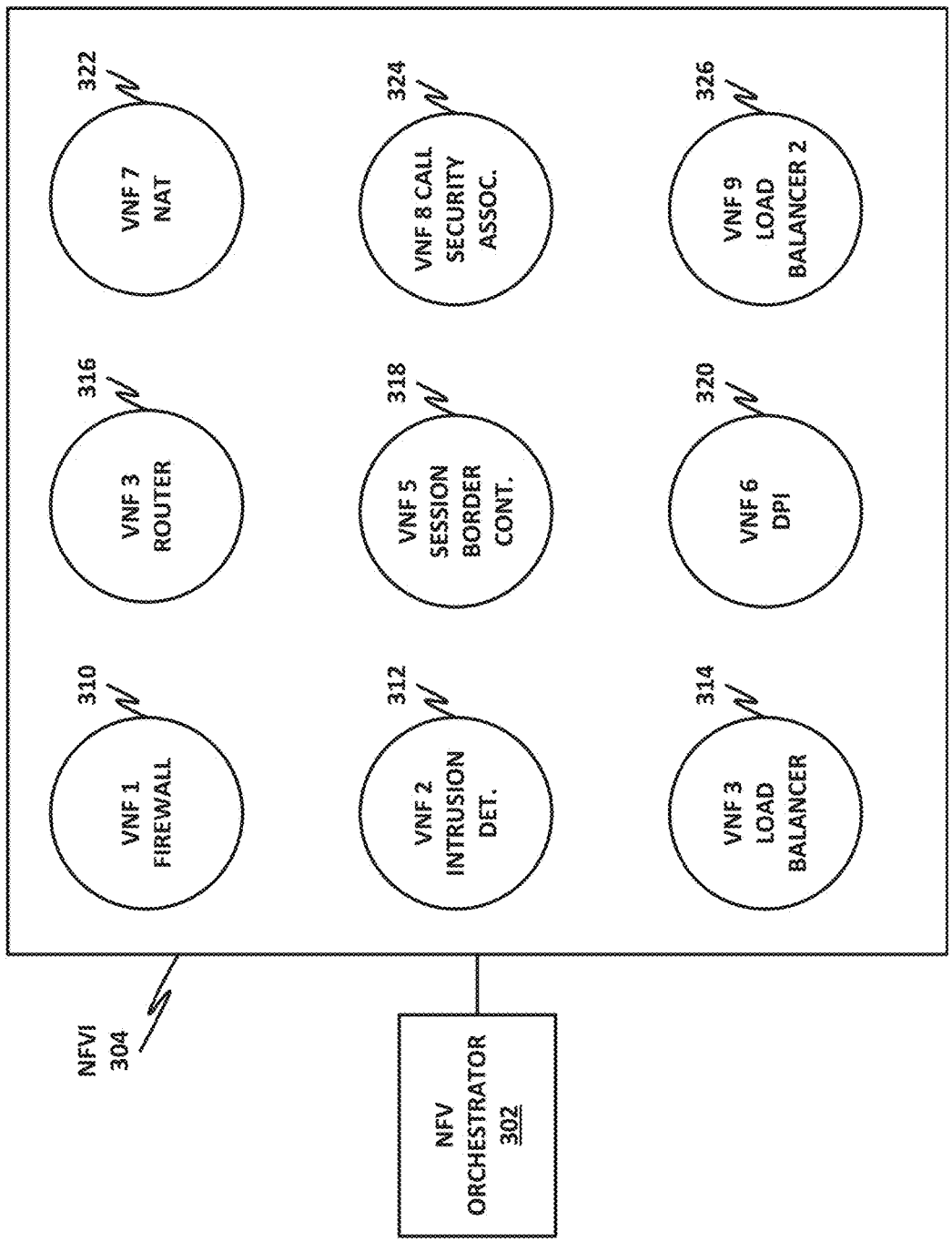
FIG. 3 is a block diagram of a network function virtualization (NFV) architecture, according to one or more examples of the present specification.

FIG. 3 is a block diagram of a network function virtualization (NFV) architecture, according to one or more examples of the present specification. NFV is a second nonlimiting flavor of network virtualization, often treated as an add-on or improvement to SDN, but sometimes treated as a separate entity. NFV was originally envisioned as a method for providing reduced capital expenditure (Capex) and operating expenses (Opex) for telecommunication services. One important feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI). Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

The illustrative example of this in FIG. 3 may be considered more functional, compared to more high-level, logical network layouts. Like SDN, NFV is a subset of network virtualization. In other words, certain portions of the network may rely on SDN, while other portions (or the same portions) may rely on NFV.

In the example of FIG. 3, an NFV orchestrator 302 manages a number of the VNFs running on an NFVI 304. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus the need for NFV orchestrator 302.

Note that NFV orchestrator 302 itself is usually virtualized (rather than a special-purpose hardware appliance). NFV orchestrator 302 may be integrated within an existing SDN system, wherein an operations support system (OSS) manages the SDN. This may interact with cloud resource management systems (e.g., OpenStack) to provide NFV orchestration. An NFVI 304 may include the hardware, software, and other infrastructure to enable VNFs to run. This may include a rack or several racks of blade or slot servers (including, e.g., processors, memory, and storage), one or more data centers, other hardware resources distributed across one or more geographic locations, hardware switches, or network interfaces. An NFVI 304 may also include the software architecture that enables hypervisors to run and be managed by NFV orchestrator 302. Running on NFVI 304 are a number of virtual machines, each of which in this example is a VNF providing a virtual service appliance. These include, as nonlimiting and illustrative examples, VNF 1 310, which is a firewall, VNF 2 312, which is an intrusion detection system, VNF 3 314, which is a load balancer, VNF 4 316, which is a router, VNF 5 318, which is a session border controller, VNF 6 320, which is a deep packet inspection (DPI) service, VNF 7 322, which is a network address translation (NAT) module, VNF 8 324, which provides call security association, and VNF 9 326, which is a second load balancer spun up to meet increased demand.

Firewall 310 is a security appliance that monitors and controls the traffic (both incoming and outgoing), based on matching traffic to a list of "firewall rules." Firewall 310 may be a barrier between a relatively trusted (e.g., internal) network, and a relatively untrusted network (e.g., the Internet). Once traffic has passed inspection by firewall 310, it may be forwarded to other parts of the network.

Intrusion detection 312 monitors the network for malicious activity or policy violations. Incidents may be reported to a security administrator, or collected and analyzed by a security information and event management (SIEM) system. In some cases, intrusion detection 312 may also include antivirus or antimalware scanners.

Load balancers 314 and 326 may farm traffic out to a group of substantially identical workload servers to distribute the work in a fair fashion. In one example, a load balancer provisions a number of traffic "buckets," and assigns each bucket to a workload server. Incoming traffic is assigned to a bucket based on a factor, such as a hash of the source IP address. Because the hashes are assumed to be fairly evenly distributed, each workload server receives a reasonable amount of traffic.

Router 316 forwards packets between networks or subnetworks. For example, router 316 may include one or more ingress interfaces, and a plurality of egress interfaces, with each egress interface being associated with a resource, subnetwork, virtual private network, or other division. When traffic comes in on an ingress interface, router 316 determines what destination it should go to, and routes the packet to the appropriate egress interface.

Session border controller 318 controls voice over IP (VoIP) signaling, as well as the media streams to set up, conduct, and terminate calls. In this context, "session" refers to a communication event (e.g., a "call"). "Border" refers to a demarcation between two different parts of a network (similar to a firewall).

DPI appliance 320 provides deep packet inspection, including examining not only the header, but also the content of a packet to search for potentially unwanted content (PUC), such as protocol non-compliance, malware, viruses, spam, or intrusions.

NAT module 322 provides network address translation services to remap one IP address space into another (e.g., mapping addresses within a private subnetwork onto the larger internet).

Call security association 324 creates a security association for a call or other session (see session border controller 318 above). Maintaining this security association may be critical, as the call may be dropped if the security association is broken.

The illustration of FIG. 3 shows that a number of VNFs have been provisioned and exist within NFVI 304. This figure does not necessarily illustrate any relationship between the VNFs and the larger network.

Figure 4:
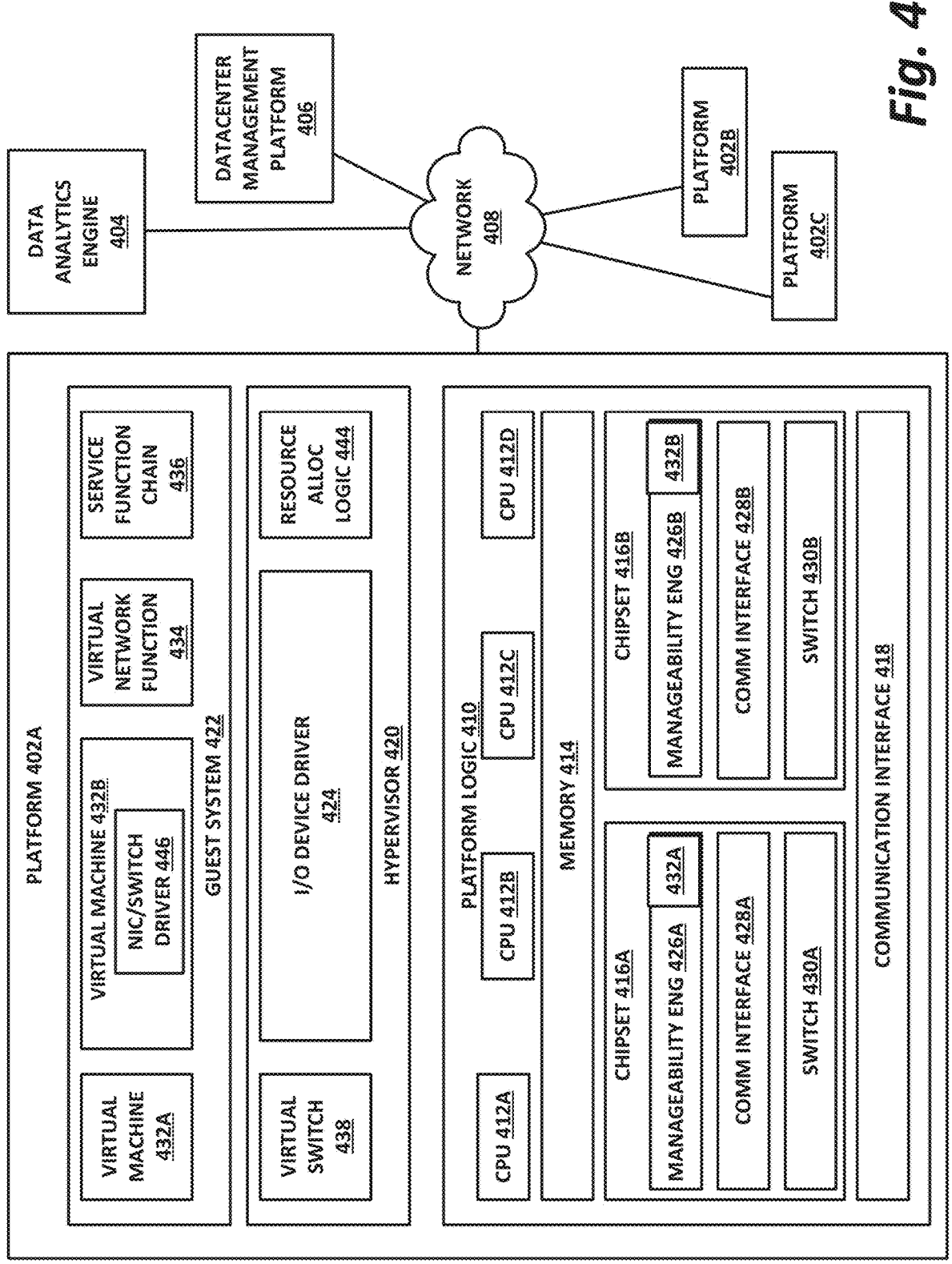
FIG. 4 is a block diagram of components of a computing platform, according to one or more examples of the present specification.

FIG. 4 illustrates a block diagram of components of a computing platform 402A, according to one or more examples of the present specification. In the embodiment depicted, platforms 402A, 402B, and 402C, along with a data center management platform 406 and data analytics engine 404 are interconnected via network 408. In other embodiments, a computer system may include any suitable number of (i.e., one or more) platforms. In some embodiments (e.g., when a computer system only includes a single platform), all or a portion of the system management platform 406 may be included on a platform 402. A platform 402 may include platform logic 410 with one or more central processing units (CPUs) 412, memories 414 (which may include any number of different modules), chipsets 416, communication interfaces 418, and any other suitable hardware and/or software to execute a hypervisor 420 or other operating system capable of executing workloads associated with applications running on platform 402. In some embodiments, a platform 402 may function as a host platform for one or more guest systems 422 that invoke these applications. Platform 402A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 406, hypervisor 420, or other operating system) of computer platform 402A may assign hardware resources of platform logic 410 to perform workloads in accordance with the stress information. In some embodiments, self-diagnostic capabilities may be combined with the stress monitoring to more accurately determine the health of the hardware resources. Each platform 402 may include platform logic 410. Platform logic 410 comprises, among other logic enabling the functionality of platform 402, one or more CPUs 412, memory 414, one or more chipsets 416, and communication interfaces 428. Although three platforms are illustrated, computer platform 402A may be interconnected with any suitable number of platforms. In various embodiments, a platform 402 may reside on a circuit board that is installed in a chassis, rack, or other suitable structure that comprises multiple platforms coupled together through network 408 (which may comprise, e.g., a rack or backplane switch).

CPUs 412 may each comprise any suitable number of processor cores and supporting logic (e.g., uncores). The cores may be coupled to each other, to memory 414, to at least one chipset 416, and/or to a communication interface 418, through one or more controllers residing on CPU 412 and/or chipset 416. In particular embodiments, a CPU 412 is embodied within a socket that is permanently or removably coupled to platform 402A. Although four CPUs are shown, a platform 402 may include any suitable number of CPUs.

Memory 414 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 414 may be used for short, medium, and/or long term storage by platform 402A. Memory 414 may store any suitable data or information utilized by platform logic 410, including software embedded in a computer readable medium, and/or encoded logic incorporated in hardware or otherwise stored (e.g., firmware). Memory 414 may store data that is used by cores of CPUs 412. In some embodiments, memory 414 may also comprise storage for instructions that may be executed by the cores of CPUs 412 or other processing elements (e.g., logic resident on chipsets 416) to provide functionality associated with the manageability engine 426 or other components of platform logic 410. A platform 402 may also include one or more chipsets 416 comprising any suitable logic to support the operation of the CPUs 412. In various embodiments, chipset 416 may reside on the same die or package as a CPU 412 or on one or more different dies or packages. Each chipset may support any suitable number of CPUs 412. A chipset 416 may also include one or more controllers to couple other components of platform logic 410 (e.g., communication interface 418 or memory 414) to one or more CPUs. In the embodiment depicted, each chipset 416 also includes a manageability engine 426. Manageability engine 426 may include any suitable logic to support the operation of chipset 416. In a particular embodiment, a manageability engine 426 (which may also be referred to as an innovation engine) is capable of collecting real-time telemetry data from the chipset 416, the CPU(s) 412 and/or memory 414 managed by the chipset 416, other components of platform logic 410, and/or various connections between components of platform logic 410. In various embodiments, the telemetry data collected includes the stress information described herein.

In various embodiments, a manageability engine 426 operates as an out-of-band asynchronous compute agent which is capable of interfacing with the various elements of platform logic 410 to collect telemetry data with no or minimal disruption to running processes on CPUs 412. For example, manageability engine 426 may comprise a dedicated processing element (e.g., a processor, controller, or other logic) on chipset 416, which provides the functionality of manageability engine 426 (e.g., by executing software instructions), thus conserving processing cycles of CPUs 412 for operations associated with the workloads performed by the platform logic 410. Moreover the dedicated logic for the manageability engine 426 may operate asynchronously with respect to the CPUs 412 and may gather at least some of the telemetry data without increasing the load on the CPUs.

A manageability engine 426 may process telemetry data it collects (specific examples of the processing of stress information will be provided herein). In various embodiments, manageability engine 426 reports the data it collects and/or the results of its processing to other elements in the computer system, such as one or more hypervisors 420 or other operating systems and/or system management software (which may run on any suitable logic such as system management platform 406). In particular embodiments, a critical event such as a core that has accumulated an excessive amount of stress may be reported prior to the normal interval for reporting telemetry data (e.g., a notification may be sent immediately upon detection).

Additionally, manageability engine 426 may include programmable code configurable to set which CPU(s) 412 a particular chipset 416 will manage and/or which telemetry data will be collected.

Chipsets 416 also each include a communication interface 428. Communication interface 428 may be used for the communication of signaling and/or data between chipset 416 and one or more I/O devices, one or more networks 408, and/or one or more devices coupled to network 408 (e.g., system management platform 406). For example, communication interface 428 may be used to send and receive network traffic such as data packets. In a particular embodiment, a communication interface 428 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 416 (e.g., manageability engine 426 or switch 430) and another device coupled to network 408. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 428 may allow communication of data (e.g., between the manageability engine 426 and the data center management platform 406) associated with management and monitoring functions performed by manageability engine 426. In various embodiments, manageability engine 426 may utilize elements (e.g., one or more NICs) of communication interfaces 428 to report the telemetry data (e.g., to system management platform 406) in order to reserve usage of NICs of communication interface 418 for operations associated with workloads performed by platform logic 410.

Switches 430 may couple to various ports (e.g., provided by NICs) of communication interface 428 and may switch data between these ports and various components of chipset 416 (e.g., one or more Peripheral Component Interconnect Express (PCIe) lanes coupled to CPUs 412). Switches 430 may be a physical or virtual (i.e., software) switch.

Platform logic 410 may include an additional communication interface 418. Similar to communication interfaces 428, communication interfaces 418 may be used for the communication of signaling and/or data between platform logic 410 and one or more networks 408 and one or more devices coupled to the network 408. For example, communication interface 418 may be used to send and receive network traffic such as data packets. In a particular embodiment, communication interfaces 418 comprise one or more physical NICs. These NICs may enable communication between any suitable element of platform logic 410 (e.g., CPUs 412 or memory 414) and another device coupled to network 408 (e.g., elements of other platforms or remote computing devices coupled to network 408 through one or more networks).

Platform logic 410 may receive and perform any suitable types of workloads. A workload may include any request to utilize one or more resources of platform logic 410, such as one or more cores or associated logic. For example, a workload may comprise a request to instantiate a software component, such as an I/O device driver 424 or guest system 422; a request to process a network packet received from a virtual machine 432 or device external to platform 402A (such as a network node coupled to network 408); a request to execute a process or thread associated with a guest system 422, an application running on platform 402A, a hypervisor 420 or other operating system running on platform 402A; or other suitable processing request.

A virtual machine 432 may emulate a computer system with its own dedicated hardware. A virtual machine 432 may run a guest operating system on top of the hypervisor 420. The components of platform logic 410 (e.g., CPUs 412, memory 414, chipset 416, and communication interface 418) may be virtualized such that it appears to the guest operating system that the virtual machine 432 has its own dedicated components.

A virtual machine 432 may include a virtualized NIC (vNIC), which is used by the virtual machine as its network interface. A vNIC may be assigned a media access control (MAC) address or other identifier, thus allowing multiple virtual machines 432 to be individually addressable in a network.

VNF 434 may comprise a software implementation of a functional building block with defined interfaces and behavior that can be deployed in a virtualized infrastructure. In particular embodiments, a VNF 434 may include one or more virtual machines 432 that collectively provide specific functionalities (e.g., wide area network (WAN) optimization, virtual private network (VPN) termination, firewall operations, load-balancing operations, security functions, etc.). A VNF 434 running on platform logic 410 may provide the same functionality as traditional network components implemented through dedicated hardware. For example, a VNF 434 may include components to perform any suitable NFV workloads, such as virtualized evolved packet core (vEPC) components, mobility management entities, 3rd Generation Partnership Project (3GPP) control and data plane components, etc.

SFC 436 is a group of VNFs 434 organized as a chain to perform a series of operations, such as network packet processing operations. Service function chaining may provide the ability to define an ordered list of network services (e.g. firewalls, load balancers) that are stitched together in the network to create a service chain.

A hypervisor 420 (also known as a virtual machine monitor) may comprise logic to create and run guest systems 422. The hypervisor 420 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 410. Services of hypervisor 420 may be provided by virtualizing in software or through hardware assisted resources that require minimal software intervention, or both. Multiple instances of a variety of guest operating systems may be managed by the hypervisor 420. Each platform 402 may have a separate instantiation of a hypervisor 420.

Hypervisor 420 may be a native or bare-metal hypervisor that runs directly on platform logic 410 to control the platform logic and manage the guest operating systems. Alternatively, hypervisor 420 may be a hosted hypervisor that runs on a host operating system and abstracts the guest operating systems from the host operating system. Hypervisor 420 may include a virtual switch 438 that may provide virtual switching and/or routing functions to virtual machines of guest systems 422. The virtual switch 438 may comprise a logical switching fabric that couples the vNICs of the virtual machines 432 to each other, thus creating a virtual network through which virtual machines may communicate with each other.

Virtual switch 438 may comprise a software element that is executed using components of platform logic 410. In various embodiments, hypervisor 420 may be in communication with any suitable entity (e.g., a SDN controller) which may cause hypervisor 420 to reconfigure the parameters of virtual switch 438 in response to changing conditions in platform 402 (e.g., the addition or deletion of virtual machines 432 or identification of optimizations that may be made to enhance performance of the platform).

Hypervisor 420 may also include resource allocation logic 444, which may include logic for determining allocation of platform resources based on the telemetry data (which may include stress information). Resource allocation logic 444 may also include logic for communicating with various components of platform logic 410 entities of platform 402A to implement such optimization, such as components of platform logic 410.

Any suitable logic may make one or more of these optimization decisions. For example, system management platform 406; resource allocation logic 444 of hypervisor 420 or other operating system; or other logic of computer platform 402A may be capable of making such decisions. In various embodiments, the system management platform 406 may receive telemetry data from and manage workload placement across multiple platforms 402. The system management platform 406 may communicate with hypervisors 420 (e.g., in an out-of-band manner) or other operating systems of the various platforms 402 to implement workload placements directed by the system management platform.

The elements of platform logic 410 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 402A may be coupled together in any suitable manner such as through one or more networks 408. A network 408 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 5:
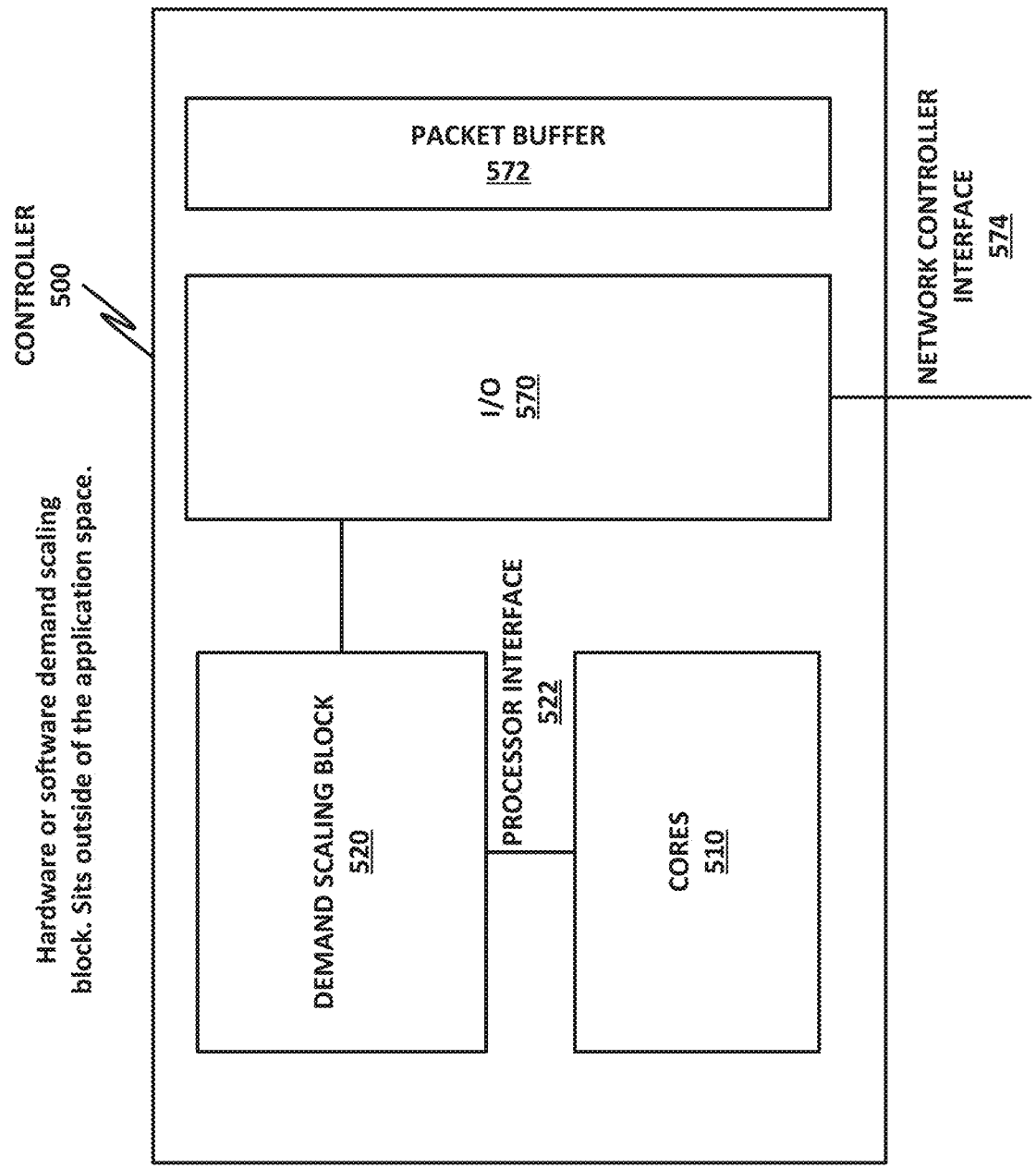
FIG. 5 is a block diagram of a controller, according to one or more examples of the present specification.

FIG. 5 is a block diagram of a controller 500, according to one or more examples of the present specification. Controller 500 may be a CPU, a microcontroller, a system-on-a-chip, or some combination of a CPU and supporting architecture. Thus, controller 500 should be understood broadly to encompass any hardware or software configuration that provides the necessary structures and functions.

In this example, controller 500 includes one or more cores 510. Cores 510 provide the processor functionality, such as those described in more detail in connection with FIG. 6. Controller 500 also includes a demand scaling block 520, which provides the demand scaling engine of the present specification. Demand scaling block 520 may include, for example, software that executes on cores 510, and that operates at a low level, including outside of the operating system. In some examples, demand scaling block 520 may also be, or include, a co-processor, including a hardware-programmed co-processor, such as an FPGA or ASIC. If implemented in sufficiently low-level software, although response may not be at true hardware speed, the engine may still be low latency, such as on the order of 4 s.

An I/O block 570 enables cores 510 and demand scaling block 520 to access external components, such as an input/output queue of a network card or a host fabric interface. For example, I/O block 570 provides a network controller interface 574, which communicatively couples to network controllers such as a network interface card or a host fabric interface (HFI). Network control interface 574 provides access to a packet buffer 572, which may be internal to controller 500, or which may be located elsewhere, such as on the actual HFI or NIC.

Demand scaling block 520 also has a processor interface 522, which communicatively couples demand scaling block 520 to cores 510. Processor interface 522 may provide an interconnect that enables demand scaling block 520 to both receive information from cores 510 concerning their current operational speed, and their current load, as well as to provide instructions to cores 510 to scale their clock speeds up or down as described herein.

Demand scaling block 520 instructs the core frequency to step up or down based on changes to the incoming traffic load, as indicated by the NIC or HFI. Demand scaling block 520 can scale frequency based on both trends (i.e., over time, to proactively meet expected changes in demand) and instantaneous changes (bursts).

In an example, demand scaling block 520 calculates a "time slice" for each packet, including how many processor cycles at the current speed (or how much real time) is required to handle each packet. Demand scaling block 520 may then make a running assessment of the current demand on the cores, including for example in-flight packets, and the size of the current transmit and receive queues in the network interface.

The current P-state of core 510 may be represented in the number of time slices or packets that can be processed in the current configuration. A delta may be computed between the current demand and the current capability. If the delta is sufficiently negative, then demand scaling block 520 may instruct cores 510 to increase their clock speed, optionally in fixed increments. If the delta is sufficiently positive for a sufficient number of review cycles, then demand scaling block 520 may instruct cores 510 to scale down their clock cycles.

Figure 6:
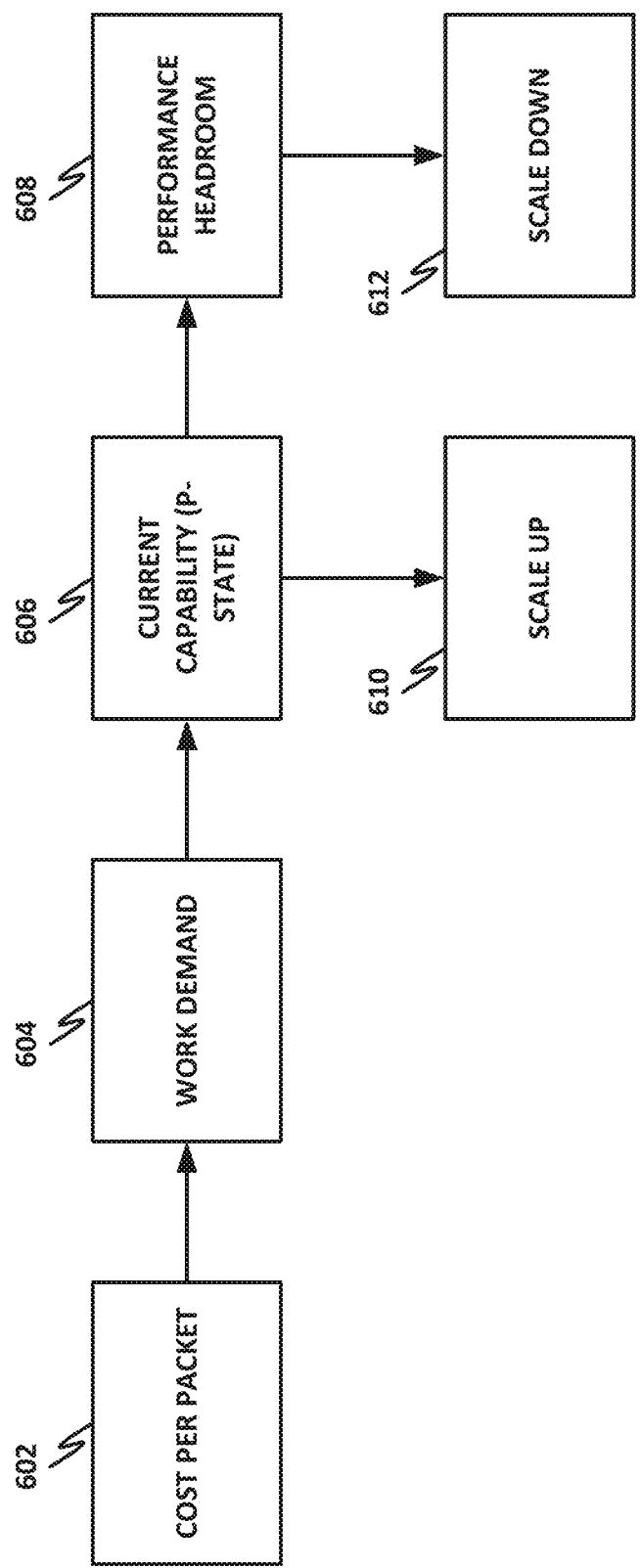
FIG. 6 is a block diagram of a scaleup and scaledown flow, according to one or more examples of the present specification.

FIG. 6 is a block diagram of a flow of performing demand scaling, according to one or more examples of the present specification. The flow may be performed, for example, by demand scaling block 520 of FIG. 5, or by some other demand scaling engine.

In block 602, the demand scaling engine calculates a cost per packet for processing a packet. This means that the demand scaling engine determines, at the current clock speed, how many cycles, or conversely how many microseconds, are required to process a single packet in the packet queue.

In block 604, the demand scaling engine also calculates a work demand on the current CPU, such as based on CPU utilization.

In block 606, the demand scaling engine calculates a current capability for the processor at its current operational speed, or P-state.

Based on the current P-state, as well as network load, the demand scaling engine may determine either that a scale up needs to occur, or that there is some performance headroom at the current clock speed.

If scale up is required, then in block 610, the scale up occurs.

On the other hand, if there is some current performance headroom, then an algorithm is used to determine whether the performance headroom persists for sufficiently long to warrant scaling down the current processor speed. If the headroom persists, then in block 612, the processor speed is scaled down.

Figure 7:
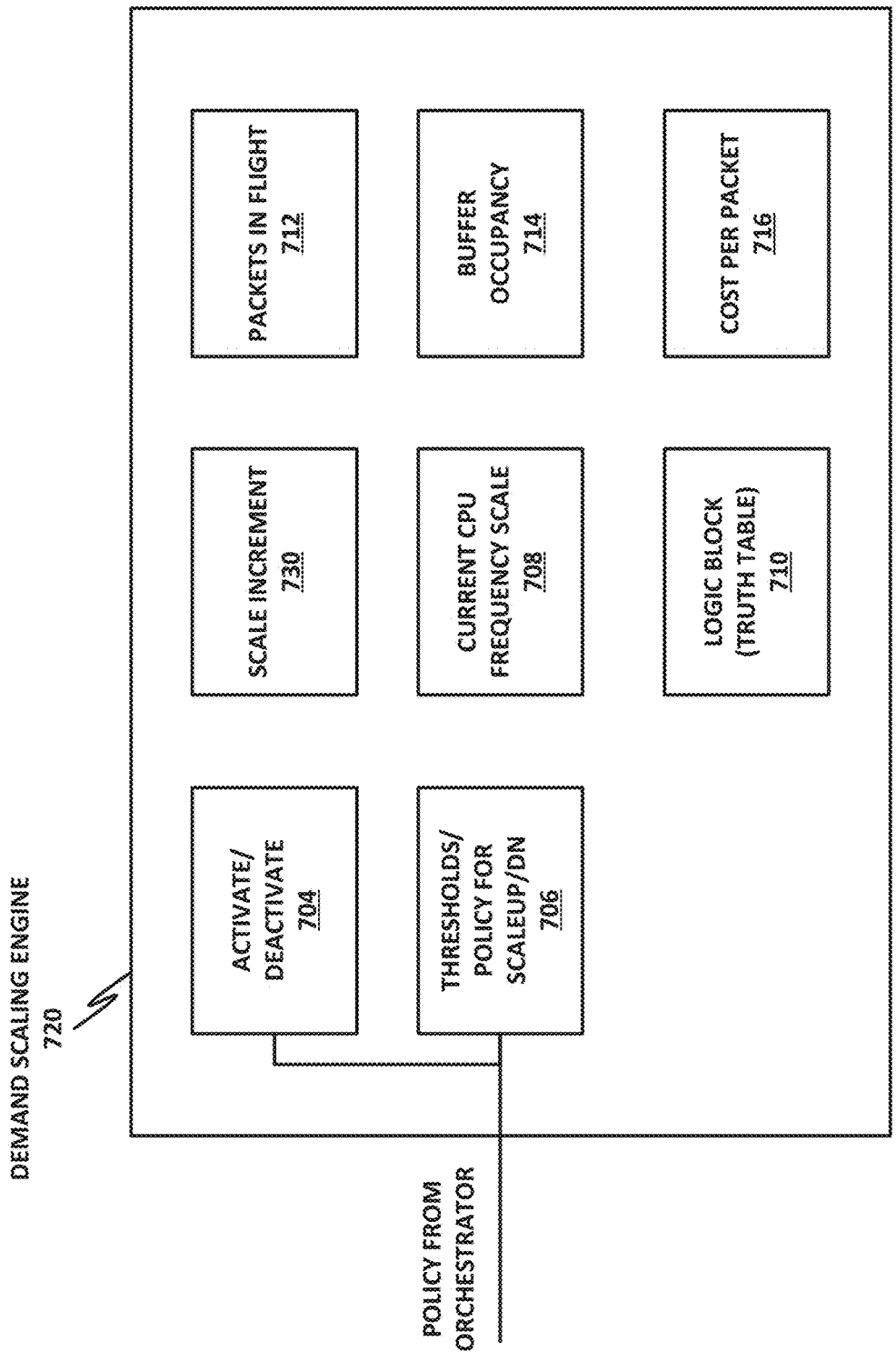
FIG. 7 is a block diagram of a demand scaling block, according to one or more examples of the present specification.

FIG. 7 is a block diagram of operational components of a demand scaling engine 720 according to one or more examples of the present specification. Demand scaling engine may be the same as demand scaling engine 224 of FIG. 2, demand scaling block 520 of FIG. 5, or may be different from either or both of them.

In this example, demand scaling engine 720 may receive policy directives from a control node, such as an orchestrator or an SDN controller, which are referred to throughout this specification, and the claims, collectively as an "orchestrator." The policy from the orchestrator may affect logical blocks, such as instructions to activate or deactivate resources 704, as well as thresholds and policies for when to scale up and scale down in block 706.

Current CPU frequency scale 708 may indicate the current operational frequency of the CPU, either in real units, or in a multiple of the scaling increment.

Scaling increment 730 specifies the size of "steps" in which the CPU may be scaled up or down. The scale may be, for example, a unit of MHz in the range between 100 and 500 MHz, such as 100 MHz, 200 MHz, 300 MHz, 400 MHz, or 500 MHz. Other scales are also possible, either less than 100 MHz or greater than 500 MHz.

Packets in flight block 712 includes the number of, and optionally the properties of, packets currently being handled by the node.

Buffer occupancy block 714 includes the number of packets currently in the buffer (input packets, output packets, or both, as appropriate).

Cost per packet 716 is a calculation of the number of cycles or microseconds that are required to process the each packet. Thus, accounting for packets in flight and buffer occupancy, compared to the cost per packet (based on the current CPU frequency scale), demand scaling engine 720 can determine how long it will take to handle the packets. If the amount of time it takes to handle the current packets will result in a bottleneck, then the CPU frequency scale may be scaled up.

Logic for determining when to scale up or scale down the CPU speed may be found in logic block 710, which may include a truth table, algorithm, or other logic for determining when to scale up and scale down the CPU operations.

After accounting for all the factors, demand scaling engine 720 whether the CPU, at its current clock speed, is sufficient, is inadequate, or has excess capacity. Depending on those decisions, demand scaling engine 720 may leave the processor at its current frequency scale, scale up, or scale down, as the situation demands.

Figure 8:
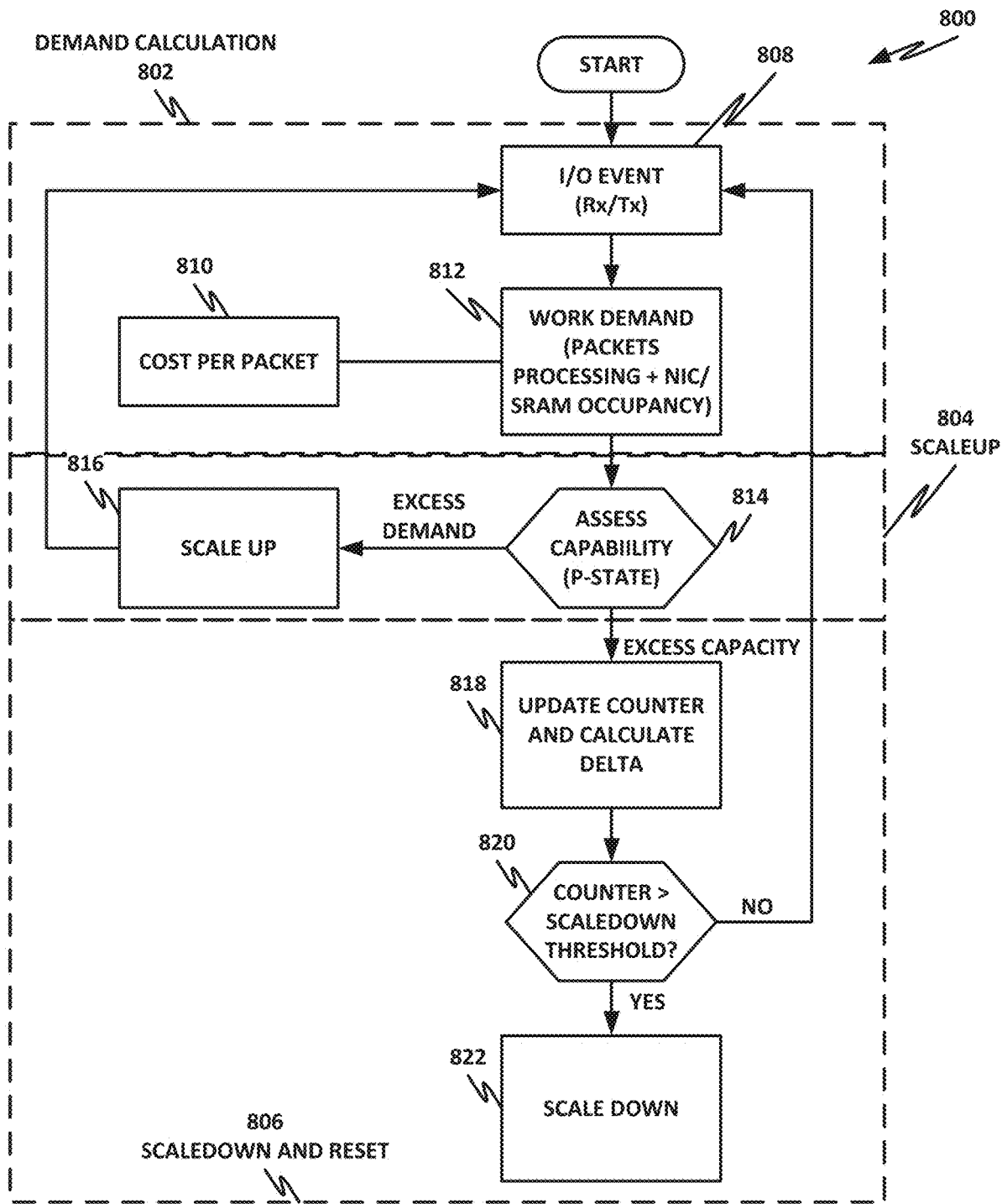
FIG. 8 is a flow chart of a method of demand scaling, according to one or more examples of the present specification.

FIG. 8 is a flowchart of a method 800 of performing frequency scaling, according to one or more examples of the present specification.

Method 800 may be broadly broken up into 3 phases, comprising demand calculation 802, scale up 804, and scale down and reset 806.

In the demand calculation phase 802, in block 808, the node receives a number of I/O events, including both receive and transmit events.

In block 812, the demand scaling engine calculates the work demand of the current packet load. This may include, for example, comparing the number of packets currently in processing with the current occupancy of a static RAM or other buffer within the NIC, HFI, or other network interface. This demand is compared to the cost per packet 812 to determine how long it takes to process each packet, how many packets are currently in the queue, and how long it will take to continue processing packets at the speed.

In the scaleup phase, in decision block 814, the demand scaling engine determines the current P state and capabilities of the processor.

If the assessment of capabilities in block 814 determines that there is excess demand, then in block 816, the processor clock speed is scaled up, as described herein. After scaling up the processor clock speed, control returns to block 808, where new packets are received and the process continues.

Returning to block 814 and proceeding to scaledown and reset 806, if the assessment of the current capacity determines that there is excess capacity, then in block 818, an excess capacity counter may be incremented. This counter may be provided to count the number of consecutive times that an excess capacity is measured. The counter is beneficial because if capacity scales down every time there is a momentary or instantaneous excess capacity, the processor can "ping-pong" between different clock speeds, thus defeating the efficiency of the present method. By waiting until there has been excess capacity for a certain number of review cycles, this ping-pong effect can be eliminated.

Continuing with block 818, the demand scaling engine increments the counter and computes a delta between the current demand and the current capacity.

In decision block 820, the demand scaling engine determines whether the counter has exceeded a programmed threshold, such as a threshold provided by the policy orchestrator as illustrated in FIG. 7.

If the threshold has not been exceeded, then control passes back to block 808, and the process continues as before.

On the other hand, if the threshold has been exceeded, then in block 822, the demand scaling engine scales down the current capacity, such as decreasing the clock speed by one or more increments.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a demand scaling engine, comprising: a processor interface to communicatively couple to a processor; a network controller interface to communicatively couple to a network controller and to receive network demand data; a scaleup criterion; a current processor frequency scale datum; and logic, provided at least partly in hardware, to: receive the network demand data; compare the network demand data to the scaleup criterion; determine that the network demand data exceeds the scaleup criterion; and instruct the processor via the processor interface to scaleup processor frequency.

Example 2 includes the demand scaling engine of example 1, wherein the network demand data are real-time network demand data.

Example 3 includes the demand scaling engine of example 1, wherein the scaleup criterion comprises a size increment.

Example 4 includes the demand scaling engine of example 3, wherein the size increment is between 100 and 500 megahertz.

Example 5 includes the demand scaling engine of example 1, wherein the scaleup criterion comprises a compute cost for current packet demand.

Example 6 includes the demand scaling engine of example 1, further comprising a data interface for receiving a policy from an orchestrator.

Example 7 includes the demand scaling engine of example 1, wherein the policy specifies a maximum processor frequency.

Example 8 includes the demand scaling engine of example 1, wherein the policy specifies a minimum processor frequency.

Example 9 includes the demand scaling engine of example 1, wherein the policy specifies an activation parameter.

Example 10 includes the demand scaling engine of example 1, wherein the policy specifies a deactivation parameter.

Example 11 includes the demand scaling engine of example 1, wherein the policy specifies a frequency scaling granularity.

Example 12 includes a computing system, comprising: a processor; a network interface; and a demand scaling engine, comprising: a processor interface to communicatively couple to the processor; a network controller interface to communicatively couple to the network controller and to receive network demand data; a scaleup criterion; a current processor frequency scale datum; and logic to: receive the network demand data; compare the network demand data to the scaleup criterion; determine that the network demand data exceeds the scaleup criterion; and instruct the processor via the processor interface to scaleup processor frequency.

Example 13 includes the computing system of example 12, wherein the network demand data are real-time network demand data.

Example 14 includes the computing system of example 12, wherein the scaleup criterion comprises a size increment.

Example 15 includes the computing system of example 14, wherein the size increment is between 100 and 500 megahertz.

Example 16 includes the computing system of example 12, wherein the scaleup criterion comprises a compute cost for current packet demand.

Example 17 includes the computing system of example 12, further comprising a data interface for receiving a policy from an orchestrator.

Example 18 includes the computing system of example 12, wherein the policy specifies a maximum processor frequency.

Example 19 includes the computing system of example 12, wherein the policy specifies a minimum processor frequency.

Example 20 includes the computing system of example 12, wherein the policy specifies an activation parameter.

Example 21 includes the computing system of example 12, wherein the policy specifies a deactivation parameter.

Example 22 includes the computing system of example 12, wherein the policy specifies a frequency scaling granularity.

Example 23 includes one or more tangible, non-transitory computer-readable mediums having stored thereon executable to instruct a processor to: communicatively couple to a processor; communicatively couple to a network controller and to receive network demand data; receive a scaleup criterion; receive a current processor frequency scale datum; and compare the network demand data to the scaleup criterion; determine that the network demand data exceed the scaleup criterion; and instruct the processor to scaleup processor frequency.

Example 24 includes the one or more tangible, non-transitory computer readable mediums of example 23, wherein the network demand data are real-time network demand data.

Example 25 includes the one or more tangible, non-transitory computer readable mediums of example 23, wherein the scaleup criterion comprises a size increment.

Example 26 includes the one or more tangible, non-transitory computer readable mediums of example 25, wherein the size increment is between 100 and 500 megahertz.

Example 27 includes the one or more tangible, non-transitory computer readable mediums of example 23, wherein the scaleup criterion comprises a compute cost for current packet demand.

Example 28 includes the one or more tangible, non-transitory computer readable mediums of example 23, further comprising a data interface for receiving a policy from an orchestrator.

Example 29 includes the one or more tangible, non-transitory computer readable mediums of example 23, wherein the policy specifies a maximum processor frequency.

Example 30 includes the one or more tangible, non-transitory computer readable mediums of example 23, wherein the policy specifies a minimum processor frequency.

Example 31 includes the one or more tangible, non-transitory computer readable mediums of example 23, wherein the policy specifies an activation parameter.

Example 32 includes the one or more tangible, non-transitory computer readable mediums of example 23, wherein the policy specifies a deactivation parameter.

Example 33 includes the one or more tangible, non-transitory computer readable mediums of example 23, wherein the policy specifies a frequency scaling granularity.

Example 34 includes a computer-implemented method of providing power management, comprising: communicatively coupling to a processor; communicatively coupling to a network controller and to receive network demand data; receiving a scaleup criterion; receiving a current processor frequency scale datum; and comparing the network demand data to the scaleup criterion; determining that the network demand data exceed the scaleup criterion; and instructing the processor to scaleup processor frequency.

Example 35 includes the method of example 34, wherein the network demand data are real-time network demand data.

Example 36 includes the method of example 34, wherein the scaleup criterion comprises a size increment.

Example 37 includes the method of example 36, wherein the size increment is between 100 and 500 megahertz.

Example 38 includes the method of example 34, wherein the scaleup criterion comprises a compute cost for current packet demand.

Example 39 includes the method of example 34, further comprising a data interface for receiving a policy from an orchestrator.

Example 40 includes the method of example 34, wherein the policy specifies a maximum processor frequency.

Example 41 includes the method of example 34, wherein the policy specifies a minimum processor frequency.

Example 42 includes the method of example 34, wherein the policy specifies an activation parameter.

Example 43 includes the method of example 34, wherein the policy specifies a deactivation parameter.

Example 44 includes the method of example 34, wherein the policy specifies a frequency scaling granularity.

Example 45 includes an apparatus comprising means for performing the method of any of examples 34-44.

Example 46 includes the apparatus of example 45, wherein the means for performing the method comprise a processor and a memory.

Example 47 includes the apparatus of example 46, wherein the memory comprises machine-readable instructions, that when executed cause the apparatus to perform the method of any of examples 34-44.

Example 48 includes the apparatus of any of examples 45-47, wherein the apparatus is a computing system.

Example 49 includes at least one computer readable medium comprising instructions that, when executed, implement a method or realize an apparatus as illustrated in any of examples 34-48.

What is claimed is:

1. A demand scaling engine, comprising:
   a processor hardware interface to communicatively couple to a processor;
   a network controller hardware interface to communicatively couple to a network controller and to receive network demand data; and
   a processing circuit, comprising an application-specific integrated circuit (ASIC) or field-programmable gate array (FPGA) configured to:
   receive a scaleup criterion comprising a processing cost for processing packet demand;
   compute a current processor frequency scale datum; and
   receive the network demand data via the network controller hardware interface;
   compare the network demand data to the scaleup criterion;
   determine that the network demand data exceeds the scaleup criterion; and
   instruct the processing circuit via the processor hardware interface to scaleup processor frequency.

2. The demand scaling engine of claim 1, wherein the network demand data are real-time network demand data.

3. The demand scaling engine of claim 1, wherein the scaleup criterion comprises a size increment.

4. The demand scaling engine of claim 3, wherein the size increment is between 100 and 500 megahertz.

5. The demand scaling engine of claim 1, further comprising a data interface for receiving a policy from an orchestrator.

6. The demand scaling engine of claim 1, further comprising a policy specifying a maximum processor frequency.

7. The demand scaling engine of claim 1, further comprising a policy specifying a minimum processor frequency.

8. The demand scaling engine of claim 1, further comprising a policy specifying an activation parameter.

9. The demand scaling engine of claim 1, further comprising a policy specifying a deactivation parameter.

10. The demand scaling engine of claim 1, further comprising a policy specifying a frequency scaling granularity.

11. The demand scaling engine of claim 1, further comprising an interface for receiving feedback for calculating a cost per packet arriving at the processor.

12. A computing system, comprising:
a processor;
a network interface;
and a demand scaling engine, comprising:
  a processor hardware interface to communicatively couple to the processor;
  a network interface hardware controller to communicatively couple to the network interface and to receive network demand data; and
  a processing circuit, comprising an application-specific integrated circuit (ASIC) or field-programmable gate array (FPGA) configured to:
    receive a scaleup criterion comprising a processing cost for current packet demand;
    compute a current processor frequency scale datum; and
    compare the network demand data to the scaleup criterion;
    determine that the network demand data exceeds the scaleup criterion; and
    instruct the processing circuit via the processor hardware interface to scaleup processor frequency.

13. The computing system of claim 12, wherein the network demand data are real-time network demand data.

14. The computing system of claim 12, wherein the scaleup criterion comprises a size increment.

15. The computing system of claim 14, wherein the size increment is between 100 and 500 megahertz.

16. The computing system of claim 12, further comprising a data interface for receiving a policy from an orchestrator.

17. The computing system of claim 12, further comprising a policy specifying a maximum processor frequency.

18. The computing system of claim 12, further comprising a policy specifying a minimum processor frequency.

19. The computing system of claim 12, further comprising a policy specifying an activation parameter.

20. The computing system of claim 12, further comprising a policy specifying a deactivation parameter.

21. The computing system of claim 12, further comprising a policy specifying a frequency scaling granularity.

22. A computer-implemented method of providing power management, comprising:
communicatively coupling to a processor;
communicatively coupling to a network controller and receiving network demand data; and
operate a processing circuit, comprising an application-specific integrated circuit (ASIC) or field-programmable gate array (FPGA) to:
  receiving a scaleup criterion comprising a compute processing cost for current packet demand;
  computing a current processor frequency scale datum;
  comparing the network demand data to the scaleup criterion;
  determining that the network demand data exceeds the scaleup criterion; and
  instructing the processing circuit to scaleup processor frequency.

23. The method of claim 22, wherein the network demand data are real-time network demand data.

24. The method of claim 22, wherein the scaleup criterion comprises a size increment.

25. The method of claim 24, wherein the size increment is between 100 and 500 megahertz.

26. One or more tangible, non-transitory computer-readable media having stored thereon instructions to:
provide early detection of a network traffic burst based at least partly on received network data identifying an amount of network traffic in a network receive queue for a core and a processor P-state, send an instruction to increase a clocking frequency of the core.

27. The one or more tangible, non-transitory media of claim 26, wherein the network data are real-time network demand data.

28. The one or more tangible, non-transitory media of claim 26, further comprising receiving a demand scaling policy from an orchestrator.

29. The one or more tangible, non-transitory media of claim 28, wherein the policy comprises a scaleup granularity.

* * * * *